Patented Jan. 6, 1948

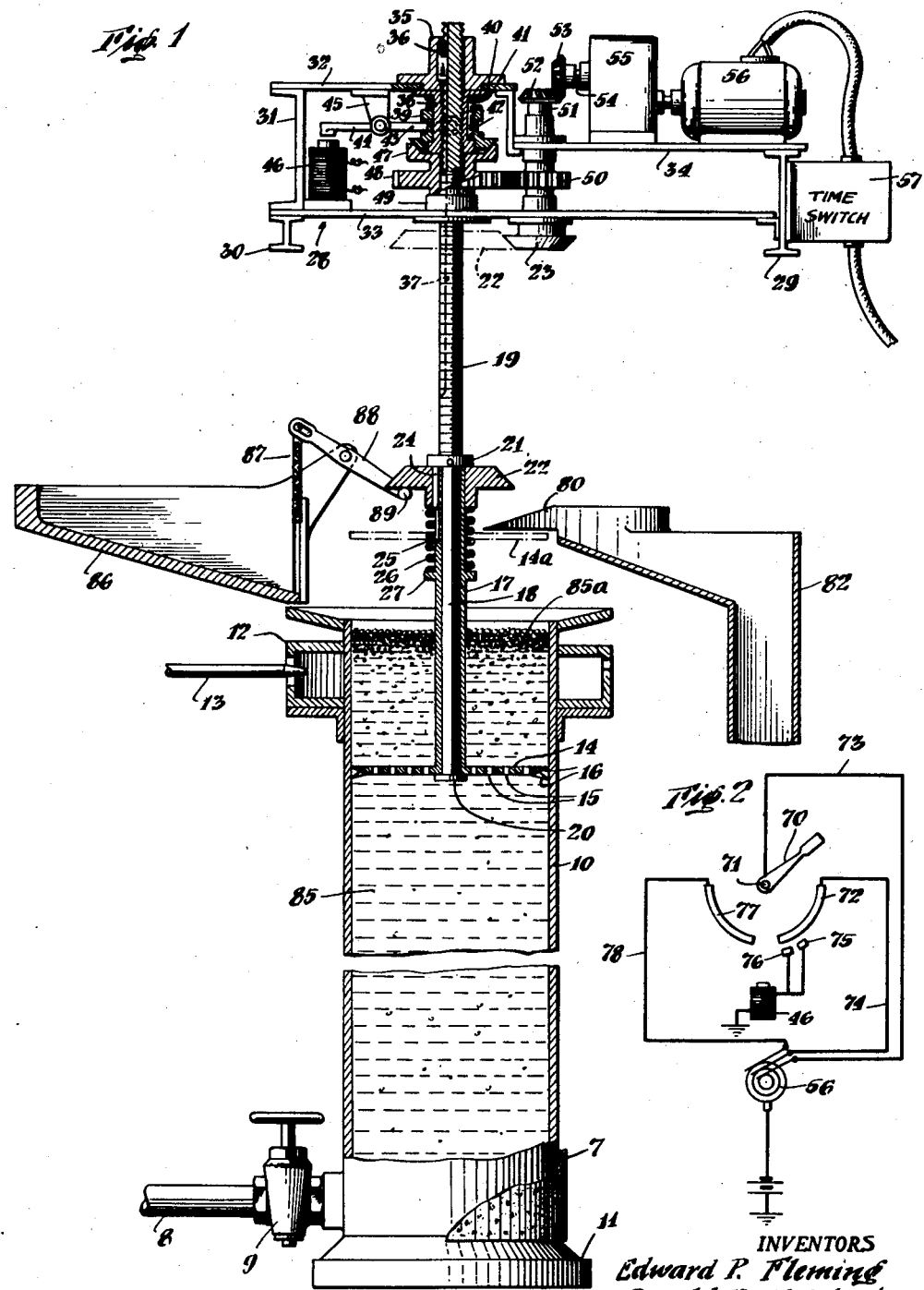

2,434,105

UNITED STATES PATENT OFFICE 2,434,105

APPARATUS FOR DROSSING BULLION

Edward P. Fleming, Los Angeles, Calif., and Donald H. McIntosh, Corpus Christi, Tex., assignors to American Smelting and Refining Company, New York, N. Y., a corporation of New Jersey Application March 22, 1944, Serial No. 527,550

7 Claims. (Cl. 266—34)

This invention relates to metallurgy and more particularly to apparatus for separating dross from molten base lead bullion.

In the recovery of lead from ores containing copper and lead it is common practice to treat the ore in a blast furnace. The base lead bullion separated from the ore may be collected in a lead well from which it is removed for subsequent treatment and refining to remove copper and other metals which may be present such as arsenic and antimony or others not desired in the lead bullion. According to known practice the hot base lead bullion from the blast furnace has been transferred to dross kettles in batches wherein a drossing operation was carried out.

In the drossing kettle the temperature is reduced so that various impurities, particularly copper, arsenic and antimony, if present, will be liquidated from the molten lead and rise to the surface as a dross. The dross containing substantial quantities of lead and copper may be then further treated to separate the lead. Usually this treatment comprises smelting in a reverberatory furnace wherein is produced a lead bullion, and a copper speiss.

The kettle method of drossing, while it is used extensively, leaves much to be desired. For example, the lead content of the dross is relatively high. That is, the copper to lead ratio is such that relatively large amounts of dross must be smelted.

According to our invention apparatus is provided which may be used for treating hot lead base bullion from the blast furnace to obtain a dross containing relatively less lead than is contained in a dross produced by the old kettle method. Accordingly, the copper to lead ratio in the dross is better and as a consequence the amount of dross to be smelted is reduced.

To accomplish the aforementioned desirable ends and others which will appear hereinafter, the invention comprehends an apparatus designed for operation in a continuous manner wherein the hot base lead bullion from the lead blast furnace may be treated effectively to separate the copper-lead dross. Employing the new apparatus, the hot molten base lead bullion from the blast furnace is charged to a suitable separating chamber or column wherein the molten metal is cooled in regulated fashion in such manner that conditions conducive to the formation and separation of dross from the lead are continuously maintained. The separated dross will contain substantially all of the copper together with arsenic and antimony originally present in the bullion from the blast furnace.

According to a preferred manner of using our invention, we continuously or intermittently charge hot molten base lead bullion which contains substantial quantities of copper, arsenic and antimony, from the blast furnace into the top of a vertically disposed hollow column and maintain the column substantially full of molten lead. As additional charge is introduced to the column, molten lead bullion is drawn from the bottom of the column. The temperature of the molten metal flowing downwardly in the column is regulated in the various zones to maintain conditions conducive to the formation of dross particles which separate from the molten metal and rise to the surface of the molten bath. As the copper-lead dross, which contains substantial quantities of copper, arsenic and antimony, collects on the surface under the influence of the regulated temperature conditions it is withdrawn from the column for such further treatment as may be desired, such as smelting in a reverberatory to separate the lead from the copper-lead dross.

Although the novel features which are believed to be characteristic of the invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a view in elevation and partly in cross section of one form of a vertical dross separator; and Fig. 2 is a diagrammatic view of a wiring diagram.

Referring to the drawings in which is shown one form of apparatus comprehended by the invention, a steel column 10 is mounted vertically on a base or foundation 11. The column shown is approximately eleven feet high and thirty inches in diameter but, of course, these dimensions may be varied to suit conditions. It is preferred, however, to have a column which is small in cross section relative to its length. At the upper section of the column is provided means for maintaining a desired temperature in the upper zones of the column. As shown, an intermediate zone is surrounded by a heating chamber 12 which may be heated by means of a fuel burner 13. A draw off pipe 8 having a plug valve 9 is connected to the lower end of the column. A lagging 7 of asbestos cement or other suitable insulating material around the column may be provided, if desired, to aid in maintaining controlled temperature conditions in the column.

Mounted for vertical reciprocal movement into and out of the column 10 through its upper open end is a grid 14, made preferably of chrome steel or in any event of a material capable of withstanding high temperatures. The grid 14 is provided with a plurality of draining apertures 15 and at its periphery is provided with staggered teeth or picks 16. The grid is fixed to a hollow shaft or sleeve 17 which is mounted for rotation on a shaft 18 fixed to a threaded stem 19. The grid is maintained on the shaft by an annular shoulder 20 and collar 21 secured to the shaft.

Mounted for vertical sliding movement on the sleeve 17 is a male section 22 of a clutch adapted to engage its cooperating section 23 described further hereinafter. The clutch section 22 is restrained from rotation on sleeve 17 by means of a key 24 in a suitable keyway in the bore of the clutch section 22 and a keyway 25 in the sleeve. Section 22 is yieldingly held against collar 21 by means of a spring 26 resting on an annular shoulder 27.

The threaded stem 19 and hence the grid 14 is suspended from a supporting mechanism which is arranged to raise and lower the grid periodically or from time to time. As shown, a main frame 28 comprising I beams 29 and 30, and channel 31 and structural cross members 32, 33 and 34, supports the operating mechanism.

A bearing 35 permits the stem 19 to pass up and down therethrough and rotation of the stem is prevented by a key 36 in the bearing and a keyway 37 in the stem. A threaded sleeve 38 engages the threaded stem 19 and upon rotation of this sleeve the stem is caused to be raised or lowered depending upon its direction of rotation. A hollow clutch section 39 is mounted for reciprocal movement on the threaded sleeve 38 and is urged downwardly by a spring 40.

The clutch member 39 is prevented from rotation on the threaded sleeve by a key 41 in suitable keyway in the member 39 and sleeve 38. The clutch member 39 is also provided with an annular groove 42 to accommodate the free end 43 of a lever 44 pivoted on a bracket 45 secured to the frame. A solenoid 46 provides means for rocking the lever 44 on its pivot and hence to reciprocate male clutch section 39 so as to raise the male section of the clutch out of engagement with its mating female clutch section 47 which is secured to gear 48. The gear 48 is mounted to rotate about the axis of the stem 19 and rotates upon a bearing 49 on the frame.

Gear 48 meshes with a gear 50 fixed to a shaft 51 having a bevel gear 52 meshing with a bevel gear 53 on shaft 54 of the speed reducer 55. The speed reducer is driven by a reversible motor 56 connected through a suitable timing switch 57 which is also connected to operate the solenoid 46.

The time switch may be arranged as shown diagrammatically in Fig. 2. The contact arm 70 rotating about its pivot 71 in response to a suitable timing and driving mechanism of conventional type, not shown, makes contact with contact member 72 for a predetermined time. During contact, current flows through conductors 73 and 74 to drive the motor 56 in one direction; for example, to rotate the train of gears and consequently gear 48. Since the clutch sections 39 and 47 are normally in engagement, the sleeve keyed to the clutch section 39 rotates, thus causing the stem and hence the grid 14 to be raised. When clutch member 22 is raised far enough, it engages clutch member 23 fixed to shaft 51. At this time the contact arm 70 is caused to engage contact member 75 to operate the solenoid 46. This causes the lever 44 to raise male clutch member 39 out of engagement with female clutch member 47. Accordingly the stem 19 stops its upward movement. Meanwhile clutch members 22 and 23 are in engagement causing the sleeve 17 and hence grid 14 to rotate about the axis of the shaft 18 at the position shown in dotted lines at 14a. In this position the grid is just below the scraper 80, suitably mounted above the column 10. Hence, as will be described hereinafter, dross on the grid will be scraped off into chute 82.

As the contact arm 70 continues its rotation past contact member 75 the current is for a short time cut off from the solenoid and hence the stem 19 will be caused to be raised a little higher. Then contact arm 70 engages contact member 76 and the solenoid again causes the clutch members 39 and 47 to become disengaged and the grid continues to rotate for a short period because clutch members 22 and 23 are engaged.

Then as contact arm 70 continues its rotation it makes contact with contact member 77, and current flows through conductor 78 to cause the motor to reverse its direction. Consequently, the stem 19 is then caused to be lowered again into the column 10. As contact arm 70 continues its rotation until it again reaches contact member 72, the grid is in its lowermost position in the column 10. In a column handling about 100 tons of bullion per 24-hour day, it is contemplated that the grid will be raised out of the column at intervals of about fifteen minutes. But it will be understood the frequency of actuation of the grid can be adjusted as experience dictates for best results.

To charge the molten bullion 85 into the column 10 a charging chute or launder 86 is mounted above the open top end of the column. It may, if desired, be provided with a gate 87 actuated by a pivoted lever 88. As shown, the clutch member 22 urges the arm 89 down to lift the gate, when the grid is in the column. When the grid is raised the lever is released to close the gate.

In one manner of utilizing the improved apparatus, hot molten base lead bullion from the lead blast furnace, containing substantial quantities of copper, arsenic and antimony may be charged into the launder 86. While the temperature of the bullion may vary considerably at different times, depending on various factors, it may be assumed for purposes of description the temperature is about 900° C. The molten bullion may then be charged to the column 10, until it is substantially filled with bullion represented by 85. As more bullion is charged to the top of the column in regulated quantity the temperature of the molten metal in the column is regulated in the various zones and drossed bullion may be continuously drawn from the column through draw off pipe 8 in regulated quantities by means of valve 9.

In a column such as shown having a height of about eleven feet and a diameter of thirty inches, and charging bullion thereto at the rate of about 75 tons a day the temperature in the bottom of the column was maintained at about 325° C., it being desirable to keep this temperature as low as possible while maintaining the bullion sufficiently molten to flow readily.

The solidifying temperature of the dross compounds which include copper, arsenic, antimony, etc., was slightly under 700° C. Accordingly, the temperature in the column at the intermediate zone extending from about 12 inches below the surface of the molten bath to about 24 inches below the surface should be maintained slightly lower than the temperature at which the dross solidifies out of the bullion. In our practice, we found a temperature of about 700° C. or a little less to be effective for dross formation. It will be understood of course that this temperature is dependent on the amount and kind of dross in the base lead bullion.

The surface temperature where the dross 85a rises on the surface of the metal should be considerably less. This surface temperature preferably should be maintained at about 400° C. while maintaining the temperature increasing down the column to about 700° C. in the zone about 12 inches below the surface of the molten bath. This gradually decreasing temperature upwards from the hot zone allows the dross to liquate out as relatively clean crystals of copper arsenide and copper antimonide forming a porous mass of dross 85a on the surface in the top zone of the column. When this mass has reached a thickness of say 3 to 4 inches it may be removed by raising the grid which is normally maintained just below the zone where the major part of the dross solidifies out of the molten metal column. Entrained molten lead drains through the grid perforations into the column, when the grid is raised. Teeth or picks 16 may be provided at the periphery of the grid to dislodge encrustations of dross having a tendency to stick to the inner surface of the column.

Below the hot zone the temperature is reduced, progressing down the column to about 325° C. Accordingly, as the column of molten metal moving downwardly is progressively cooled there is provided a condition conducive to solidifying out of additional amounts of copper, arsenic and antimony as dross which form as particles or agglomerates and rise toward the top of the column. The small particles of dross will pass through the perforated plate to the hot zone. Here they may be redissolved and form larger agglomerates and eventually emerge in the surface mass.

If it is desired to remove the dross 85a collected on the surface of the molten metal in the column by mechanical and automatic means this may be accomplished, as suggested hereinbefore, by mechanism described, which is adjusted to raise the grid from time to time or at periodic intervals. As the grid is raised, say every fifteen minutes, the dross 85a formed is lifted on the grid 14, which permits hot entrained molten lead to drain through when the grid is raised. When the grid reaches a position just below the scraper 80 it is caused to rotate and the dross is caused to be scraped off into chute 82 for subsequent treatment as may be desired.

It will be seen from the foregoing that means are provided permitting hot base lead bullion to be drossed to be charged to a column, and caused to move downwardly. The temperature in the column is regulated to provide a hot zone intermediate a cooler zone at the surface, and a cooler zone at the bottom of the column. The temperature above the hot zone becomes progressively cooler toward the top and the temperature below the hot zone becomes progressively cooler toward the bottom. The hot zone is preferably maintained at a temperature slightly below that at which the dross, containing substantial quantities of copper, arsenic and antimony, solidifies out of the base bullion; the surface temperature is maintained somewhat above the melting point of the lead and the temperature at the bottom of the column is maintained as low as possible compatible with maintaining the lead molten for handling in the drain off.

Utilizing the apparatus of the invention we have obtained a dross which amounted to 10% of the charged metal compared to 16% for the old kettle drossing practise charging the same metal. Moreover, the amount of lead in the dross produced when using the instant device, was markedly less as compared to the dross recovered from the same metal by the kettle method. Also, the drossed bullion was better than that produced by the older practice; whereas in the kettle method the drossed bullion produced, contained .09% copper and .17% arsenic when treating a given lead base bullion, the drossed bullion produced when treating the same lead base bullion in the apparatus of our invention contained only .06% copper and .08% arsenic. As will be recognized by those skilled in the art, this will result in substantial savings in the further treatment of the drossed bullion to remove residual copper and arsenic, since it is well known that the removal of the residual copper and arsenic is, relatively speaking, very expensive.

Although certain preferred embodiments of the invention have been shown for purposes of illustration, the invention is not to be regarded as being necessarily limited thereto, it being understood that the invention is defined in the appended claims.

What is claimed is:

1. In a system for separating dross from bullion, an elongate vertical column into which is charged and caused to flow downwardly the molten bullion to be drossed, means for charging the molten bullion to be drossed into said column, a conduit to draw off drossed bullion from the lower end of said column, and means positioned exteriorly of the upper end of the column for maintaining a hot zone in said column below the surface of the molten bullion therein while the molten bullion flowing downwardly from said hot zone is allowed to progressively cool by radiation alone.

2. In a system for separating dross from lead-containing bullion, an elongate vertical column through which flows molten bullion to be drossed, said column having an opening in the top for removal of dross formed in said column, heating means positioned at the upper end of said column and exteriorly thereof to maintain a hot zone in said column intermediate a cooler surface zone where dross collects and a lower cooler zone from which dross bullion is removed, and a conduit for removing drossed bullion from said lower zone.

3. In a system for separating dross from bullion, an elongate vertical column into which is charged and caused to flow downwardly the molten bullion to be drossed, said column having an opening for removal of dross formed in said column, means for charging the molten bullion to be drossed into said column, a conduit to draw off drossed bullion from the lower end of said column, and means exterior of the upper end of said column for maintaining a hot zone in said column below the surface of the molten bullion therein while the molten bullion flowing downwardly from said hot zone is allowed to progressively cool, and dross supporting means movable in and out of said opening for removing dross separated from said bullion in the column.

4. In a system for separating dross from bullion, an elongate vertical column into which is charged and caused to flow downwardly the molten bullion to be drossed, said column having an opening in the top for removal of dross formed in said column, means for charging the molten bullion to be drossed into said column, a conduit to draw off drossed bullion from the lower end of said column, means exterior of the upper end of said column for maintaining a hot zone in said column below the surface of the molten bullion therein while the molten bullion flowing downwardly from said hot zone is allowed to progressively cool, and means for removal of dross from said column, said dross removal means comprising a vertically movable dross supporting member movable to a position below the surface of the molten bullion in the column and liftable out of said column to carry dross from said column.

5. In a system for separating dross from bullion, an elongate vertical column into which is charged and caused to flow downwardly the molten bullion to be drossed, said column having an opening in the top for removal of dross formed in said column, means for charging the molten bullion to be drossed into said column, a conduit to draw off drossed bullion from the lower end of said column, means exterior of the upper end of said column for maintaining a hot zone in said column below the surface of the molten bullion therein while the molten bullion flowing downwardly from said hot zone is allowed to progressively cool, and means for removal of dross from said column, said dross removal means comprising a vertically movable dross supporting member movable to a position below the surface of the molten bullion in the column and liftable out of said column to carry dross from said column, and means to raise and lower said dross supporting member at intervals of time.

6. In a system for separating dross from bullion, an elongate vertical column into which is charged and caused to flow downwardly molten bullion to be drossed, means for charging the molten bullion to be drossed into said column, a conduit to draw off drossed bullion from the lower end of said column, and means for removal of dross formed in said column, said dross removal means comprising a grid-like member capable of supporting dross thereon, means mounting said grid for vertical movement into and out of said column, and means for causing said dross supporting member to be lowered to a position below the surface of the bullion in the column and then to be raised out of said column to remove dross therefrom from time to time.

7. Apparatus for drossing bullion which comprises an elongate vertical column open at its upper end into which is charged molten bullion to be drossed, means for charging molten bullion into said column, means to remove drossed bullion from said column, and means for removal of dross formed in said column, said dross removal means comprising a perforated dross supporting member, means mounting said member for rotatable movement and for vertical movement into and out of said column to lift dross from said column, and means for removing the dross from said member after it is lifted out of said column.

EDWARD P. FLEMING.
DONALD H. McINTOSH.

REFERENCES CITED

The following references are of record in the file of this patent:

UNITED STATES PATENTS

| Number | Name | Date |
|---|---|---|
| 1,774,688 | Williams | Sept. 20, 1930 |
| 515,081 | Iles | Feb. 20, 1894 |
| 2,349,972 | Lister | May 20, 1944 |
| 563,769 | Howard | July 14, 1896 |
| 2,337,042 | Gloss | Dec. 21, 1943 |